UNITED STATES PATENT OFFICE 2,943,060
Patented June 28, 1960

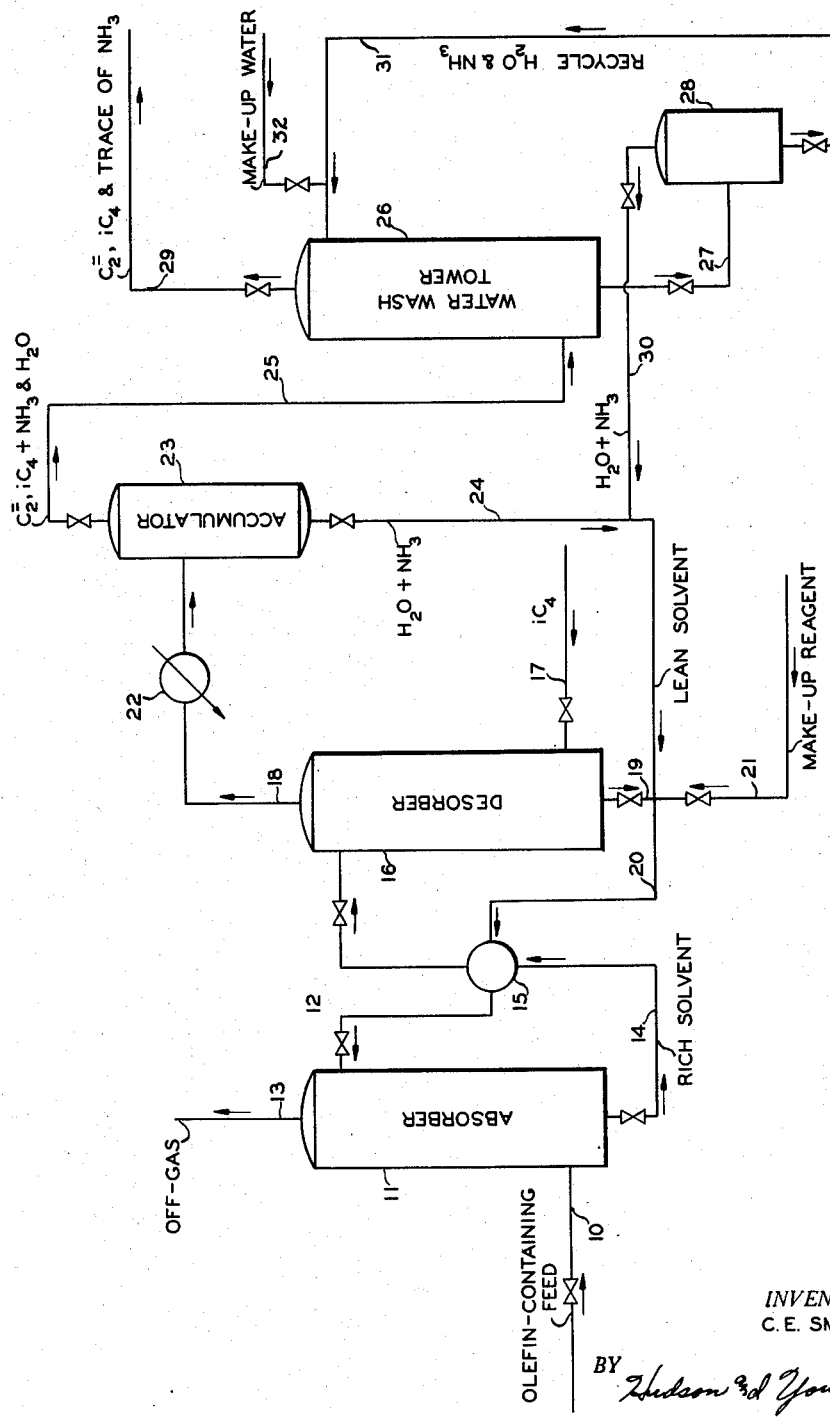

2,943,060

CUPROUS SALT-HYDROXYALKYLAMINE SOLUTIONS

Clifford E. Smith, Bartlesville, Okla., assignor to Phillips Petroleum Company, a corporation of Delaware Filed Aug. 25, 1955, Ser. No. 530,557

16 Claims. (Cl. 252—182)

This invention relates to cuprous salt-hydroxyalkylamine solutions of improved thermal stability and to a process for preparing such solutions.

The recovery of olefins from mixtures with saturated hydrocarbons utilizing solutions of cuprous salt in nitrogen bases is conventional in the art. The copending application of Gardner C. Ray and Harold J. Hepp, Serial No. 514,506, filed June 10, 1955, now U.S. Patent No. 2,894,049, discloses an ethylene recovery process utilizing an aqueous solution of copper salt-monoethanolamine which is particularly effective in absorbing ethylene from an ethylene-containing hydrocarbon stream. In processes of this type the cuprous salt apparently forms a complex with the olefin in preference to other hydrocarbons and the olefin is recovered from the complex by heating and/or subjecting the solution containing the olefin to reduced pressure. Usually the combination of heating and reduced pressure is utilized and it is desirable to heat the solution to a temperature of about 60° C. or higher in order to efficiently recover the olefin. At these temperatures the cuprous salt solution deteriorates relatively rapidly so that regeneration of the same is required in order to render the cuprous salt solution suitable for further extraction of olefin from mixture with saturated hydrocarbons.

An object of the present invention is to provide cuprous salt-hydroxyalkylamine solutions of improved heat stability and, particularly, solutions of this nature in which the amine is monoethanolamine. Another object is to provide improved solutions of cuprous nitrate-monoethanolamine of high heat stability. It is also an object of the invention to provide a process for preparing solutions of cuprous salt-hydroxyalkylamine of improved heat stability and, particularly, cuprous salt-monoethanolamine solutions. Other objects of the invention will become apparent from a consideration of the accompanying disclosure.

The invention provides improved solutions of cuprous salts in aqueous hydroxyalkylamines having improved thermal stability properties and, consequently, longer useful life. The reagent is prepared by dissolving a mixture of either metallic copper or cuprous oxide with cupric oxide in a solution of the hydroxyalkylamine, water, and the desired ammonium salt by any suitable method, the improvement comprising the addition of ammonia and/or an ammonium salt to the cuprous salt-hydroxyalkylamine solution after dissolution of the copper and prior to utilization of the reagent for the separation of unsaturated hydrocarbons, e.g., ethylene or propylene from mixtures containing the same. Suitable amines comprise monoethanolamine, diethanolamine, propanol amines, butanol amines, etc. Monoethanolamine has been found most suitable and is preferred. The amines may be used in admixture but it is preferred to use a larger proportion of monoethanolamine in such mixtures. Cuprous salts found suitable for use in the invention include the acetate, chloride, sulfate, nitrate, formate, propionate, lactate, tartrate, etc. The nitrate is preferred.

The utilization of cuprous salts dissolved in a suitable liquid medium such as, for example, aqueous organic bases or aqueous $NH_3$, in processes for the recovery of normally gaseous olefin hydrocarbons, particularly ethylene or propylene, from gaseous hydrocarbon streams containing them is conventional as stated above. In these processes the olefins are dissolved in the cuprous reagent principally by formation of a soluble coordination complex with cuprous ions. The recovery of the olefin from the complex is usually effected by subjecting the olefin-containing solution to at least one of the steps of pressure reduction and heating to cause liberation of the dissolved olefin. Following liberation of the olefins the resulting olefin-denuded salt solution may be then reused to absorb olefins from a fresh portion of the olefin-containing stream.

Particularly suitable reagents for such processes are solutions of the cuprous salts, such as, for example, cuprous nitrate, cuprous chloride, and cuprous acetate in aqueous monoethanolamine. However, the monoethanolamine-copper salt solutions are unstable on heating to temperatures of the order of 80° C., which are desirable for satisfactory desorption of the hydrocarbons from the solutions. When this reagent is heated to temperatures sufficiently high to desorb essentially all of the complexed olefins, reactions occur which eventually lead to the deposition of metallic copper, and in some cases, deposition of copper-containing sludge. The various degradation reactions resulting therefrom are very undesirable, especially, since the deposits formed foul various pieces of plant equipment such as pumps, transfer lines, bubble trays and the like. Further, since loss of copper to deposits depletes the liquid reagent of copper, these reagents gradually lose capacity for absorbing olefins.

Broadly, the present invention relates to an improved process for the preparation of cuprous salt-hydroxyalkylamine reagents, particularly those comprising cuprous nitrate and monoethanolamine, for use in the separation and recovery of unsaturated hydrocarbons, especially olefins such as ethylene or propylene, from mixtures with saturated hydrocarbons. According to the present invention I have now discovered that the thermal stability and the useful life of cuprous salt-hydroxyalkylamine solutions can be greatly improved by the addition of free ammonia and/or an ammonium salt to the cuprous reagents after preparation of the reagent, and prior to use. I have found that the addition of such ammonium salts as ammonium chloride, ammonium nitrate, and ammonium acetate and/or ammonium hydroxide all materially lengthen the useful life of cuprous salts such as cuprous nitrate, cuprous chloride, and cuprous acetate in solution in monoethanolamine. I have also found that the addition of excess ammonia and/or an ammonium salt to the cuprous reagent during dissolution of the copper into the monoethanolamine does not materially improve the useful life of the reagent, but when the excess ammonia or ammonium salt is added after preparation of the cuprous salt-monoethanolamine solution by any suitable method, the life of the solution is lengthened up to as much as 9 times that of the original solution. If the excess ammonium salt is added to the reagent during its preparation, substantially all of the free ammonia is driven off during dissolution of the copper into the ethanolamine solution.

Various methods are described in the art for the preparation of cuprous salt-monoethanolamine solutions which methods are generally applicable to the reagents here involved. Following is a brief outline of a generally preferred method of preparing the reagents, particularly a cuprous nitrate-monoethanolamine solution, of the present invention. An admixture of cuprous oxide or metallic copper with cupric oxide is added to a solution of ammonium nitrate and ammonium hydroxide containing an excess of the nitrate over the stoichiometric equivalent of the copper. The solution is heated and stirred during the dissolution of the copper and ammonia is usually driven off during this heating step. Following dissolution of the copper, monoethanolamine is added to the solution while stirring and heating at elevated temperature, e.g., 90° C., and heating is continued until no ammonia is given off. The cuprous nitrate reagent may also be prepared by dissolving a mixture of metallic copper and/or cuprous oxide with cupric oxide in a mixture of monoethanolamine, water, and ammonium nitrate. The ammonium nitrate is dissolved in the water and the solution mixed with the amine. The copper-copper oxide mixture is added to the solution and heat is applied so as to gradually raise the temperature to and hold it at about 70° C. The copper-copper oxide is held in suspension by constant stirring until all of it goes into solution. As the metal goes into solution ammonia is evolved, and stirring is usually continued until this evolution stops. The amount of total copper in the reagents should be in the range of 8 to 15 weight percent, preferably 10 to 12 weight percent of the solution. In accordance with the present invention, ammonia and/or an ammonium salt is added to the cuprous salt-monoethanolamine solution after its preparation and after cooling to ambient temperature, whether by the above-described methods or by any other known method in the art, so as extend its useful life for the absorption olefins. The amount of ammonia and/or ammonium salt added to the reagent should be at least 5 percent of the stoichiometric equivalent of the cuprous copper in the solution, i.e., 5 moles per 100 moles of cuprous copper. Amounts of 40 percent have been employed with excellent results. Amounts up to 100 percent and higher can be used but without material improvement over a 40 percent concentration based on the copper equivalent. While it is difficult to prepare the cuprous salt-ethanolamine solution with a sufficient ammonia and/or ammonium salt content to stabilize the solution by adding an excess of the same over that required to convert the copper to the cuprous salt and controlling the heating and copper solution step so as not to drive off all of the ammonia, such a procedure may be followed to provide a reagent having a concentration of ammonia or ammonium salt equivalent to at least 5 percent of the cuprous copper. However, it is difficult to control the concentration of the $NH_4$ ion by this method and, therefore, the step of adding the ammonia and/or ammonium salt after dissolution of the copper in the solution is much preferred.

The amount of cupric copper required in the solution is very small and usually should be in the range of about 1 to 2 or 3 percent of the copper content of the solution. However, even a trace suffices, but it is more practical to maintain a concentration not too near the zero point so as to avoid possible copper deposition. Concentrations of 0.1 percent up to 20 percent of the copper content are operable. In preparing solutions in accordance with the invention, it is generally sufficient to use reagent grade cuprous oxide which generally contains enough cupric oxide to provide sufficient cupric ion.

The cuprous salt reagents of the invention contain 8 to 15, and preferably 10 to 12, weight percent Cu, from a trace up to 20 percent of which may be cupric copper, monoethanolamine (or other hydroxyalkylamine) in the rangee of about 40 to 60 weight percent, water in the range of about 10 to 35 weight percent, and the balance the anion of the copper salt.

The cuprous reagents of the present invention are preferably contacted with the hydrocrbon in the gaseous phase. Any suitable method of contacting the gases with the liquid solution of cuprous salt may be employed. The preferred procedure is to contact countercurrently the hydrocarbon in the gas phase with the liquid in a tower provided with bubble plates or other contact elements such as sprays, packing, baffles, etc. Desorption of the olefins from the cuprous reagents can be effected by subjecting the solution to at least one of pressure reduction or heating to cause liberation of the dissolved olefin. If desired, the olefin can be removed from the solution by stripping with an inert gas such as isobutane, etc.

Better understanding of my invention will be obtained upon reference to the accompanying schematic flow diagram, which shows the utilization of my improved reagent, i.e., cuprous nitrate-monoethanolamine solution, for the recovery of ethylene from a hydrocarbon stream containing it.

Referring now to the drawing, a gaseous ethylene-containing hydrocarbon stream obtained from a source not shown is passed through line 10 to absorber 11. The feed gas is introduced near the bottom of absorber 11 and rises countercurrent to a cuprous nitrate-ethanolamine solution containing ammonia in a concentration of about 40 percent of the cuprous salt equivalent and admitted by line 12. The ethylene is absorbed at elevated pressure in the cuprous nitrate-ethanolamine-ammonia solution, and the denuded gas is discharged by vent pipe 13 from the top of absorber 11. The enriched cuprous nitrate - ethanolamine - ammonia solution is withdrawn from the bottom of absorber 11 and passed via line 14 through heat exchanger 15 to the top of desorber 16 through which it passes downwardly countercurrent to a stream of isobutane supplied from line 17. The isobutane strips the absorbed ethylene from the cuprous nitrate-ethanolamine-ammonia solution and a mixture of isobutane and ethylene together with a small amount of ammonia, depending upon the desorption conditions and especially the temperature, is taken overhead via line 18. If desired, the ethylene can be released in the desorberd by either applying heat and/or reducing the pressure. The lean cuprous nitrate-ethanolamine-ammonia solution is withdrawn from the bottom of desorber 16 via lines 19 and 20 and passed through heat exchanger 15, and then returned to the top of absorber 11. Make-up cuprous nitrate-ethanolamine-ammonia solution is introduced through line 21 as needed. The selective absorption is usually conducted at a partial pressure of the ethylene of 1–100 p.s.i.a., preferably 15–90 p.s.i.a, and at a temperature in the range of about −30 to 60° C., preferably 10–50° C. Desorption as shown can be carried out at about atmospheric pressure and a temperature of about 25–60° C., preferably 40–55° C.

The gaseous mixture removed by line 18 from the top of desorber 16 comprises ethylene, isobutane, some ammonia, and water; and this mixture is passed through heat exchanger 22 wherein it is cooled so as to condense out some of the entrained water and ammonia, which is collected in accumulator 23. The ammonia and water solution is advantageously recycled to the absorber by introducing it into the lean solvent in line 21 via line 24. Make-up ammonia and/or ammonium salt may be introduced to the absorber, as needed, via line 21 or by means of a separate inlet line (not shown). Ethylene and isobutane partially denuded of water and ammonia removed from accumulator 23 is passed via line 25 to water wash tower 26 wherein substantially all of the remaining ammonia and water in the feed are removed and passed from tower 26 via line 27 to separator 28. Ethylene and isobutane and a trace of ammonia are removed from the wash tower by line 29 for further processing conventional in the art or as desired. This stream can be suitably employed as part of the feed for a diisopropyl alkylation unit. If a high purity ethylene stream is needed, the ammonia can be removed from the ethylene by washing with dilute sulfuric acid, or by other suitable means. A portion of the ammonia washed from the ethylene is recovered in separator 28 and recycled via line 30 and added to the lean absorbent in line 20. Operating as set for the above, very little ammonia, if any, is lost and consequently the reagent can be used for a long time without any copper deposition. The wash water containing some ammonia is recycled to the wash tower via line 31. Make-up water is added via line 32 as needed.

A series of thermal stability tests was made on cuprous nitrate, cuprous chloride, and cuprous acetate solutions in aqueous monoethanolamine. It was found during these tests that at temperatures of about 60° C. and higher, a decrease in the cupric copper content of the solution with time was occurring. A solution containing cupric copper has a characteristic blue color, whereas a solution with no cupric copper content is colorless. It was also found that the rate of disappearance of the cupric ion from the solution increased as the cupric ion concentration became smaller. Shortly after the solution becomes colorless a deposit of free copper appears. This occurs to satisfy the equilibrium $Cu^+ \rightleftarrows Cu^{++} + Cu^0$. As long as a small amount, such as a trace, of the cupric ion is present, no precipitation of free copper occurs.

Data are presented in the table below, comparing the time required for $Cu^{++}$ removal, and subsequent free-copper deposition, from cuprous nitrate, cuprous chloride, and cuprous acetate solutions in monoethanolamine at several temperatures both with and without excess ammonium salts added during the preparation of the reagent, and with excess ammonia or ammonium salts added according to the present invention after preparation of the reagent.

The various cuprous salts shown in the table without an excess of ammonium ion in the final solution were prepared as follows. In one case 42.2 grams of $NH_4Cl$, in another, 59.5 grams $NH_4Ac$, and in still another, 62.5 grams of $NH_4NO_3$ were added to 250 cc. concentrated $NH_4OH$. Then 45 grams $Cu_2O$ and 5 grams CuO were added to the ammoniacal solution. This solution was stirred and heated to a temperature of about 50° C. and held until the copper went into solution. Following this step 250 cc. of monoethanolamine was added to the solution. Again the solution was stirred and heated to a temperature of about 90° C. and held at this temperature until there was no ammonia odor. Both the excess water and ammonia were removed in the second heating step. The cuprous chloride-monoethanolamine solution contained 1.84 weight percent cupric copper based on the total copper content, the acetate solution contained 1.17 weight percent, and the nitrate solution contained 1.47 weight percent cupric copper initially. The two cuprous nitrate-monoethanolamine solutions prepared with 20 percent and 40 percent excess ammonium ion were prepared the same as above except that 72.6 grams $NH_4NO_3$ and 83.8 grams of $NH_4NO_3$ were used, respectively. The 20 percent excess preparation contained 1.64 weight percent cupric copper, and the other 1.84 weight percent cupric copper.

The cuprous reagents containing 40 percent excess ammonium ion were prepared in the same manner as those prepared without an excess with the exception that either 40 percent excess $NH_4Cl$, $NH_4OH$ or $NH_4Ac$ was added to the reagent after dissolution of the copper in the monoethanolamine and removal of excess water and ammonia.

From the data at 70° C. it can be seen that the addition of an ammonium salt to the nitrate, chloride, or acetate solutions of cuprous copper, or the addition of $NH_4OH$ in the case of the nitrate, increased the thermal stability of the solutions materially. For example, the life of the chloride solution was increased almost ninefold, while the life of the nitrate solution was doubled. It should be noted that the addition of $NaNO_3$ to the $NO_3$ did not improve the stability, but decreased it.

Table

| Temperature, °C. | Anion | Percent Excess* $NH_4^+$ | $t_1$ (days) | Remarks |
|---|---|---|---|---|
| 60 | $NO_3^-$ | 0 | 22 | |
| 70 | $NO_3^-$ | 0 | 7–8 | |
| 80 | $NO_3^-$ | 0 | 1 | |
| 60 | Cl- | 0 | 25 | |
| 70 | Ac- | 0 | 8 | |
| 70 | Cl- | 0 | 7.8 | |
| 70 | $NO_3^-$ | c20 | 8.8 | Added during preparation. |
| 70 | $NO_3^-$ | c40 | 8.4 | Do. |
| 70 | $NO_3^-$ | a40 | 18 | |
| 70 | $NO_3^-$ | b40 | 5 | |
| 70 | $NO_3^-$ | c40 | 11 | |
| 70 | Cl- | a40 | 70 | |
| 70 | Ac- | d40 | 13 | |

*Excess over that required in the preparation of the solution from $Cu_2O$, i.e., $2Cu_2O + NH_4X \rightarrow 2CuX + 2NH_4OH$.
a Salt was $NH_4Cl$.
b Salt was $NaNO_3$.
c Concentrated $NH_4OH$ added.
d Salt was $NH_4Ac$.
e Salt was $NH_4NO_3$.

Certain modifications of the invention will become apparent to those skilled in the art and the illustrative details disclosed are not to be construed as imposing unnecessary limitations on the invention.

I claim:

1. A process for preparing an improved cuprous salt-alkanolamine solution which comprises forming a solution comprising cupric ion, a cuprous salt, and an alkanolamine of not more than 4 carbon atoms per molecule, said solution containing between 8 and 15 weight percent Cu of which 0.1 to 20 percent is cupric copper between 40 and 60 weight percent alkanolamine, between 10 and 35 weight percent water, and anion of the cuprous salt; and thereafter dissolving in said solution at least one member of the group ammonium acetate, ammonium chloride, ammonium nitrate, and ammonium hydroxide in an amount in the range of 5 to 100 moles per 100 moles of cuprous copper so as to increase the stability of said solution.

2. The process of claim 1 wherein the ammonium salt comprises ammonium nitrate.

3. The process of claim 1 wherein the ammonium salt comprises ammonium chloride.

4. The process of claim 1 wherein the ammonium salt comprises ammonium acetate.

5. A process for preparing an improved cuprous salt-monoethanolamine solution which comprises dissolving cupric oxide and at least one member of the group consisting of cuprous oxide and copper in a solution of an ammonium salt of the group consisting of ammonium chloride, ammonium nitrate, and ammonium acetate in ammonium hydroxide; mixing with the resulting solution monoethanolamine; heating the resulting cuprous salt-monoethanolamine solution until ammonia ceases to be driven off, the resulting solution containing between 8 and 15 weight percent Cu of which 0.1 to 20 percent is cupric copper, between 40 and 60 weight percent monoethanolamine, between 10 and 35 weight percent water, and anion of said salt; and thereafter dissolving in the resulting solution at least one member of the group consisting of ammonium acetate, ammonium chloride, ammonium nitrate and ammonium hydroxide in an amount in the range of 20 to 100 percent of the stoichiometric equivalent of the cuprous salt in said solution.

6. A process for preparing an improved cuprous salt-monoethanolamine solution which comprises dissolving a mixture of cupric oxide and at least one member of the group consisting of cuprous oxide and copper in a mixture of monoethanolamine, water, and an ammonium salt of the group consisting of ammonium acetate, ammonium chloride, ammonium nitrate by heating and stirring the copper-containing mixture until evolution of ammonia ceases, the resulting solution containing between 8 and 15 weight percent Cu of which 0.1 to 20 percent is cupric copper, between 40 and 60 weight percent monoethanolamine, between 10 and 35 weight percent water, and anion of said salt; and thereafter dissolving in said solution at least one member of the group consisting of ammonium acetate, ammonium chloride, ammonium nitrate, and ammonium hydroxide in an amount in the range of 5 to 100 percent of the stoichiometrical equivalent of the cuprous salt in said solution.

7. The process of claim 6 wherein the ammonium salt in the first step comprises ammonium nitrate and ammonium nitrate is added to the cuprous salt-monoethanolamine solution.

8. A stabilized solution of cuprous salt and alkanolamine of not more than 4 carbon atoms per molecule containing between 8 and 15 weight percent $Cu$ of which 0.1 to 20 percent is cupric copper, between 40 and 60 weight percent alkanolamine, between 10 and 35 weight percent water, and anion of cuprous salt before addition of hereinafter named ammonium ion, and ammonium ion incorporated in said solution after complete dissolution of the copper salt in an amount in the range of 5 to 100 percent of the stoichiometric equivalent of the cuprous salt, said solution having greater stability than before incorporating said ammonium ion therein.

9. The solution of claim 8 wherein said alkanolamine comprises monoethanolamine.

10. The solution of claim 8 wherein the ammonium ion is incorporated in the solution by dissolving therein ammonium nitrate.

11. The solution of claim 8 wherein the ammonium ion is incorporated in the solution by dissolving therein ammonium chloride.

12. The solution of claim 8 wherein the ammonium ion is incorporated in the solution by dissolving therein ammonium acetate.

13. The solution of claim 8 wherein the anion of the cuprous salt is $NO_3$ and the ammonium ion is incorporated in the solution by dissolving therein ammonium nitrate.

14. The solution of claim 8 wherein the anion of the cuprous salt is $NO_3$ and the ammonium ion is incorporated in the solution by dissolving therein ammonium chloride.

15. The solution of claim 8 wherein the anion of the cuprous salt is Cl and the ammonium ion is incorporated in the solution by dissolving therein ammonium chloride.

16. The solution of claim 8 wherein the anion of the cuprous salt is $NO_3$ and the solution includes ammonium hydroxide and ammonium nitrate.

References Cited in the file of this patent

UNITED STATES PATENTS

| | | |
|---|---|---|
| 2,005,500 | Joshua et al. | June 18, 1935 |
| 2,235,119 | Robey | Mar. 18, 1941 |
| 2,245,719 | Robey | June 17, 1941 |
| 2,376,239 | Evans et al. | May 15, 1945 |
| 2,383,784 | Fleer | Aug. 28, 1945 |
| 2,429,134 | Morrell et al. | Oct. 14, 1947 |
| 2,445,520 | Francis et al. | July 20, 1948 |
| 2,494,546 | Fasce | Jan. 17, 1950 |
| 2,561,822 | Savoy | July 24, 1951 |

FOREIGN PATENTS

| | | |
|---|---|---|
| 120,546 | Great Britain | Jan. 15, 1920 |
| 540,896 | Germany | Dec. 28, 1931 |

OTHER REFERENCES

Handbook of Chemistry and Physics, 28th Ed., pages 338–343 and 376–382 (1944), pub. by Chemical Rubber Pub. Co., Cleveland, Ohio.

UNITED STATES PATENT OFFICE
CERTIFICATE OF CORRECTION

June 28, 1960

Patent No. 2,943,060

Clifford E. Smith

It is hereby certified that error appears in the printed specification of the above numbered patent requiring correction and that the said Letters Patent should read as corrected below.

Column 7, line 16, for "percent $C_{11}$" read -- percent Cu --.

Signed and sealed this 25th day of April 1961.

(SEAL)

Attest:
ERNEST W. SWIDER
Attesting Officer

DAVID L. LADD
Commissioner of Patents